(No Model.)
W. H. UNDERWOOD.
HAIR CLIPPER.
No. 324,435. Patented Aug. 18, 1885.
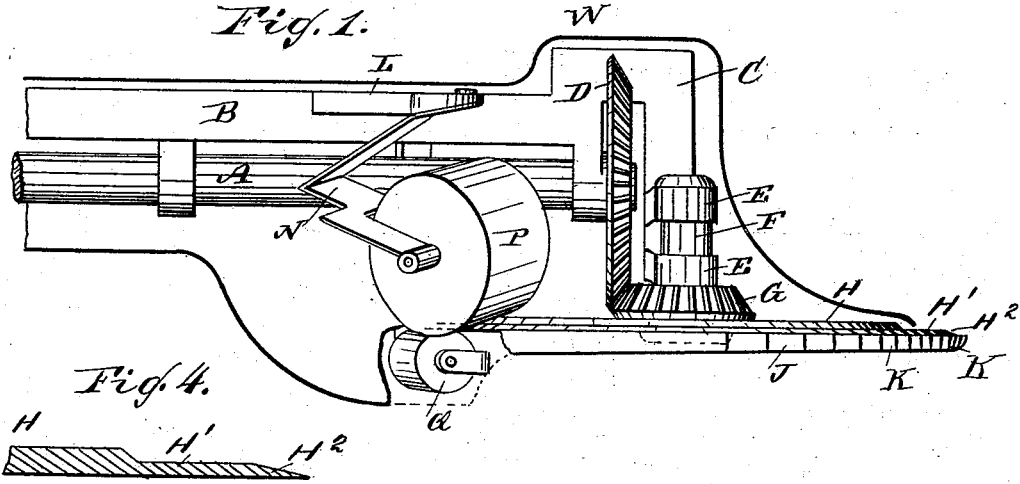
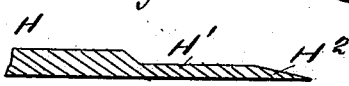
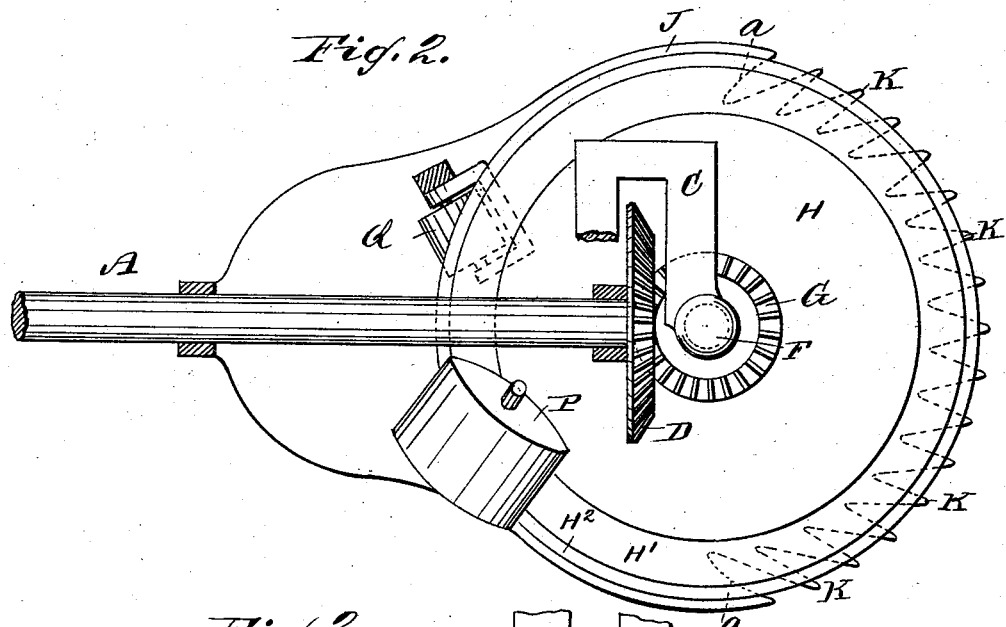
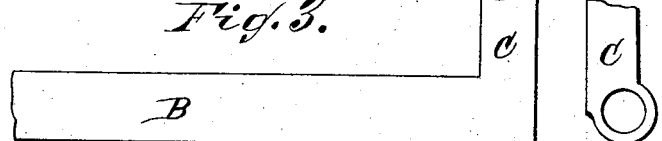
WITNESSES:
Theo. G. Hoster
C. Sedgwick
INVENTOR:
W. H. Underwood
BY
Munn
ATTORNEYS.

UNITED STATES PATENT OFFICE.

WALTER H. UNDERWOOD, OF DENVER, COLORADO.

HAIR-CLIPPER.

SPECIFICATION forming part of Letters Patent No. 324,435, dated August 18, 1885.

Application filed November 14, 1884. (No model.)

*To all whom it may concern:*

Be it known that I, WALTER H. UNDERWOOD, of Denver, in the county of Arapahoe and State of Colorado, have invented a new and Improved Clipping Device, of which the following is a full, clear, and exact description.

The object of my invention is to provide a new and improved clipping device for clipping, which device is so constructed that its cutting-blade is sharpened automatically.

The invention consists in a clipping device having an abrading-wheel in contact with the cutter, whereby the cutter is automatically sharpened as it revolves.

The invention also consists in parts and details, and combinations of the same, as will be fully described and set forth hereinafter.

Reference is to be had to the accompanying drawings, forming part of this specification, in which similar letters of reference indicate corresponding parts in all the figures.

Figure 1 is a longitudinal elevation of my improved clipping device, a portion being broken away. Fig. 2 is a plan view of the same, parts being broken out and others shown in section. Fig. 3 is a detail view of part of the frame. Fig. 4 is a detail sectional view of the edge part of the cutting-disk.

The shaft A is journaled in hangers or eyes on a bar, B, the end of which is formed in the shape of an elbow, C, which projects from the said bar suitably to support the operating mechanism. On the end of the shaft A a bevel cog-wheel, D, is rigidly mounted, and on the end of the elbow C two eyes, E, are formed, in which a short shaft, F, is journaled, on which is mounted a bevel-pinion, G, engaging with the bevel cog-wheel D. On the lower end of the short shaft F, and below the bevel-pinion G, a circular cutting-disk, H, is held, by a screw or analogous device, which circular cutting-disk has a thinner cutting part, H', on its edge, which is provided with a bevel cutting-edge, $H^2$. The cutting-disk H revolves directly above the finger-plate J, the end of which is curved on a circular line, and is provided with a series of teeth, K, the ends of which project slightly beyond the edge of the cutting-disk, the said teeth or fingers K being on a circular line, and the inner edge of the first recess forming the teeth is slightly rounded inward or curved, as shown at *a* in Fig. 2. From the bar B an arm, L, projects, which is provided at its free end with an enlargement having a segmental slot, M. An angular or bent arm, N, is pivoted to the under side of the arm L, and is provided with a pin, O, which passes through the slot M, whereby the said arm N is guided. In the lower end of the arm N an emery-wheel, P, or other abrading-disk, is pivoted, which abrading-disk rests upon the cutting-edge of the cutting-disk H. The axis of the abrading-disk is inclined about at an angle of forty-five degrees to the longitudinal axis of the shaft A, and is inclined to the radii of the disk H, and the wheel P is also inclined slightly to the vertical plane, so that its edge will be at an inclination to the top surface of the disk H about equal to the inclination of the bevel $H^2$ on the edge of the disk H. The emery-wheel P is arranged at one side of the shaft A and above the cutting-disk H, and on the other side of the shaft and below the disk a roller, Q, is arranged, which is held in a suitable U-shaped arm connected with the bar B, or is pivoted in any other suitable manner. The longitudinal axis of the roller Q is inclined to the longitudinal axis or plane of the shaft A about forty-five degrees, and to the radii of the disk H, and the said roller Q is also slightly inclined to the vertical plane, and the cutting-disk H runs upon the roller Q. This roller may be made of hard steel, or it may be made of emery, or of any other suitable abrading substance. If desired, an additional roller may be provided above the top surface of the disk H, in the same manner as the roller P, for the purpose of polishing the edge of the disk after it has been sharpened by the roller P. The inclination of the shaft of the roller P to the longitudinal axis or plane of the shaft A can easily be adjusted by changing the inclination of the pivoted arm N to the fixed arm L on the bar or frame B. The shaft A is connected by means of a universal joint, or some other analogous coupling, with a shaft for transmitting motion to the shaft A, which is thus revolved, and from which, by means of the bevel-wheel and pinion D G, the cutting-disk H is revolved.

The finger-plate J is placed on the skin of the animal and forced into the hair or wool, and as the hair passes in between the teeth K it is cut off by the edge of the disk H. The disk H at the same time revolves the abrading-disk P, which sharpens the cutting-edge of the disk H and forms a slight feather edge on the under side of the disk H, which feather-edge is removed by the roller Q, which either grinds it off or presses it upward and outward. The annular part H' of the cutting-disk is made thinner than the rest, so that as the disk wears off and decreases in diameter the cutting-edge of the disk can always be formed on the thinner part H'. The concaved edges a, at the ends of the curved edge of the teeth, guide and conduct the hair against the cutting-edge of the disk H. The abrading disk or wheel P and the roller Q can be applied on reciprocating cutting-blades in the same manner as described above, or can also be applied on endless-belt cutters. The arm N is to have more or less spring-tension, so as to press the sharpening disk or wheel P upon the edge of the disk H, and to compensate for any loss in the diameter of the disk or wheel P.

The entire device is surrounded by a casing, W.

Having thus described my invention, what I claim as new, and desire to secure by Letters Patent, is—

1. In a clipping device, the cutting-disk H, having its edge portion, H', reduced in thickness, and provided with a cutting-edge, H², substantially as herein shown and described.

2. In a clipping device, the combination, with a cutter, of an abrading-disk having its abrading-edge parallel with and in contact with the beveled cutting-edge, whereby the cutter will be automatically sharpened, substantially as herein shown and described.

3. In a clipping device, the combination, with a cutter, of an abrading-wheel in contact with the upper surface, and a roller in contact with the lower surface, substantially as herein shown and described.

4. In a clipping device, the combination, with the bar B, provided with the arm L and the cutter H, of devices for revolving the cutter, the arm N, and the abrading-wheel P, held on the free end of the said arm and resting on the cutter H, substantially as herein shown and described.

5. In a clipping device, the combination, with the bar B and cutter H, of devices for revolving the said cutter, of the arm L projecting from the bar B and having a segmental slot, M, the arm N, pivoted on the arm L, the pin O, projecting from the arm N through the slot M in the arm L, and of the abrading-wheel P, held on the arm N, and resting on the edge of the cutter H, substantially as herein shown and described.

6. In a clipping device, the combination, with the bar B, having an elbow, C, of the shaft A, carrying the cog-wheel D, the shaft F, pivoted in the elbow C, and carrying the pinion G, the finger-plate J, the circular cutter-disk H, secured on the end of the shaft F, and the abrading-wheel P, resting on the edge of the cutter H, substantially as herein shown and described.

WALTER H. UNDERWOOD.

Witnesses:
OSCAR F. GUNZ,
C. SEDGWICK.